US012597175B2

(12) United States Patent
Jin et al.

(10) Patent No.: US 12,597,175 B2
(45) Date of Patent: Apr. 7, 2026

(54) AVATAR CREATION FROM NATURAL LANGUAGE DESCRIPTION

(71) Applicant: Samsung Electronics Co., Ltd., Suwon-si (KR)

(72) Inventors: Kun Jin, San Jose, CA (US); Siva Penke, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 18/590,707

(22) Filed: Feb. 28, 2024

(65) Prior Publication Data

US 2025/0022187 A1 Jan. 16, 2025

Related U.S. Application Data

(60) Provisional application No. 63/525,810, filed on Jul. 10, 2023.

(51) Int. Cl.
G06T 11/00 (2006.01)
G06F 40/58 (2020.01)

(52) U.S. Cl.
CPC .............. G06T 11/00 (2013.01); G06F 40/58 (2020.01)

(58) Field of Classification Search
CPC ........... G06T 11/00; G06F 40/58; G06F 40/30
See application file for complete search history.

(56) References Cited

U.S. PATENT DOCUMENTS 9,665,563 B2    5/2017    Min
9,992,556 B1 *    6/2018    Price ................. H04N 21/4302

10,042,536 B2    8/2018    Goossens
10,304,439 B2    5/2019    Okaniwa
11,514,634 B2    11/2022    Liao
2007/0113181 A1    5/2007    Blattner
2015/0187112 A1    7/2015    Rozen
2021/0125389 A1 *    4/2021    Tommy .................. G06F 40/30
2021/0248804 A1    8/2021    Hussen Abdelaziz
(Continued)

FOREIGN PATENT DOCUMENTS

CN    113609255 A    11/2021
CN    115409923 A    11/2022
(Continued)

OTHER PUBLICATIONS

Zehranaz Canfes and M. Furkan Atasoy and Alara Dirik and Pinar Yanardag, "Text and Image Guided 3D Avatar Generation and Manipulation", 2202.06079, https://arxiv.org/abs/2202.06079 (Year: 2022).*

(Continued)

*Primary Examiner* — Kee M Tung
*Assistant Examiner* — Xiaoming Wei

(57) ABSTRACT

In one embodiment, a method includes accessing, by a computing device, a natural-language input comprising a description of an avatar and generating, from the natural-language input and by a trained avatar-creation model, a set of avatar-attribute feature vectors. The method further includes determining, by a trained avatar-attribute classifier, one or more avatar attributes from the set of avatar-attribute feature vectors; and generating the avatar based on the determined one or more avatar attributes for presentation on a display of a computing device.

20 Claims, 3 Drawing Sheets

(56) References Cited

U.S. PATENT DOCUMENTS

| | | | | |
|---|---|---|---|---|
| 2021/0327404 A1 | 10/2021 | Savchenkov | | |
| 2022/0084273 A1 | 3/2022 | Pan | | |
| 2023/0177878 A1* | 6/2023 | Sekar | ...................... | G06F 40/40 |
| | | | | 382/103 |
| 2024/0029330 A1* | 1/2024 | Donnell | ................. | G06N 3/084 |
| 2024/0304177 A1* | 9/2024 | Wu | ......................... | G06F 40/30 |
| 2024/0404225 A1* | 12/2024 | Ghosh | ....................... | G06T 7/74 |

FOREIGN PATENT DOCUMENTS

| | | | |
|---|---|---|---|
| CN | 112990302 B | 3/2023 | |
| CN | 115392216 B | 3/2023 | |

OTHER PUBLICATIONS

Zhao et al. "Zero-Shot Text-to-Parameter Translation for Game Character Auto-Creation", Mar. 2, 2023, https://doi.org/10.48550/arXiv.2303.01311 (Year: 2023).*

"10 Best Free AI Avatar Generator Online Websites [Updated]" by Himanshu Tyagi, available at <https://www.codeitbro.com/free-ai-avatar-generator-websites/>, Jan. 16, 2023.

"Text and Image Guided 3D Avatar Generation and Manipulation" by Zehranaz Canfes, M. Furkan Atasoy, Alara Dirik, Pinar Yanardag, Available at <https://catlab-team.github.io/latent3D/>, Accessed on Dec. 20, 2023.

"10 Best AI Image Generator Review" by Harley Wayne, available at <https://topten.ai/image-generator-review/>, Nov. 7, 2023.

Synthesia platform, <https://www.synthesia.io/home?utm_term=synthesia&utm_campaign=Synthesia&utm_source=google&utm_medium=cpc&hsa_acc=5132031546&hsa_cam=20686432010&hsa_grp=156404489922&hsa_ad=677786397346&hsa_src=g&hsa_tgt=kwd-323407513834&hsa_kw=synthesia&hsa_mt=e&hsa_net=adwords&hsa_ver=3&gad_source=1&gclid=CjwKCAiAvoqsBhB9EiwA9XTWGXXjyUbVQGra3k2jp2Bd28qx8rF-T9qCV_WoFtyB2sQWm4uP0TQINRoC4AkQAvD_BwE>, Accessed on Dec. 20, 2023.

* cited by examiner

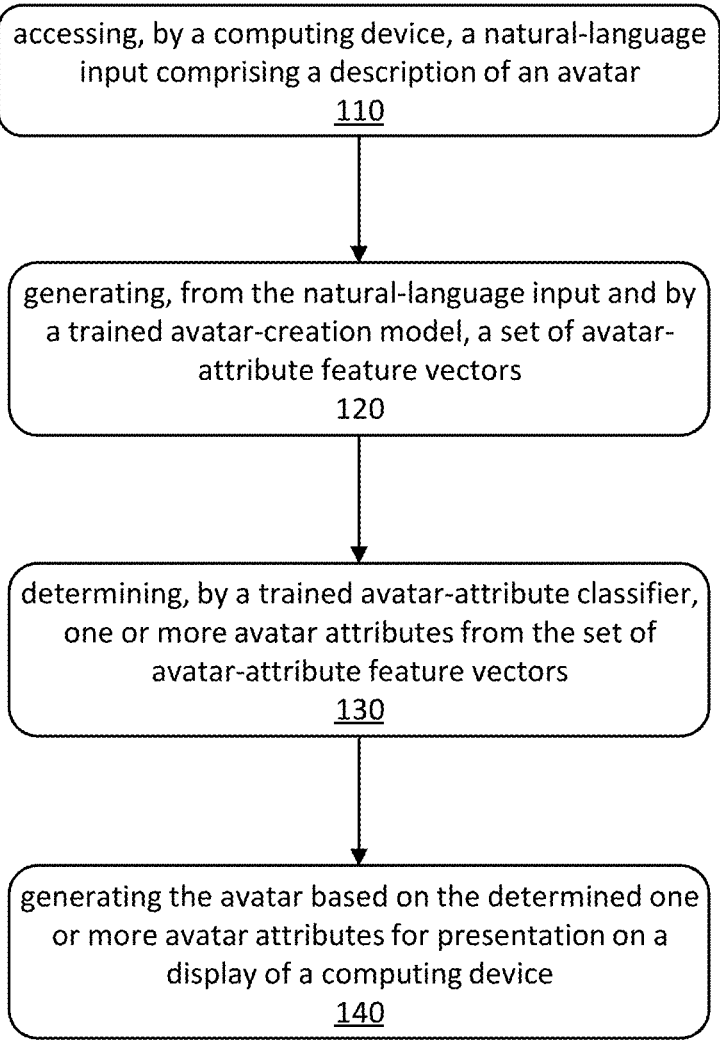

accessing, by a computing device, a natural-language input comprising a description of an avatar
110 generating, from the natural-language input and by a trained avatar-creation model, a set of avatar-attribute feature vectors
120 determining, by a trained avatar-attribute classifier, one or more avatar attributes from the set of avatar-attribute feature vectors
130 generating the avatar based on the determined one or more avatar attributes for presentation on a display of a computing device
140

Fig. 1

AVATAR CREATION FROM NATURAL LANGUAGE DESCRIPTION

PRIORITY CLAIM

This Application claims the benefit under 35 U.S.C. § 119 of U.S. Provisional Patent Application No. 63/525,810 filed Jul. 10, 2023, the entirety of which is incorporated by reference herein.

TECHNICAL FIELD

This application generally relates to avatar creation from natural language description.

BACKGROUND

In computing, an avatar is a graphical representation of a person. Avatars often appear with human-like representations but may take animal representations as well. In some circumstances avatars have a customizable appearance. An avatar can take a two-dimensional (2D) form, such as in a profile picture. An avatar can also take a three-dimensional (3D) form. Avatars can be static or can be dynamic, and 3D avatars are often dynamic in that they can be animated so as to move, talk, change facial expressions, and represent a variety of other actions, emotions, or poses.

BRIEF DESCRIPTION OF THE DRAWINGS

FIG. 1 illustrates an example method for creating an avatar from natural-language (NL) input using a zero-shot, NL pipeline.

DESCRIPTION OF EXAMPLE EMBODIMENTS

Creating or customizing an avatar is typically a time-consuming process that requires a user to select from among various visual representations of an avatar. For example, in a 3D avatar creation process, a user may need to specify each detail of the avatar's appearance, such as the shape of the head, the style and color of the hair, the shape and color of the eyes, the shape of the nose and mouth, the size and shape of the body, and the style and color of the clothing. Each of these items may have multiple options or variations to choose from, which can further extend the time required for the creation or customization process.

FIG. 1 illustrates an example method for creating an avatar from natural-language (NL) input using a zero-shot, NL pipeline. Step 110 of the example method of FIG. 1 includes accessing, by a computing device, a natural-language input that includes a description of an avatar. The natural-language input may include a textual input, such as text input by a user on an interface (e.g., a touchscreen, a keyboard, etc.) of a device. In particular embodiments, the natural-language input may include a voice input, such as input spoken by a user and detected by a microphone. In particular embodiments, accessing the natural-language input includes accessing the input as provided by the user (e.g., accessing a text or voice input). In particular embodiments, accessing the natural-language input includes accessing a processed version of the input. For example, voice input may be converted to text input, which is then accessed in step 110 of the example method of FIG. 1. As another example, natural-language input in a language other than a default language may be translated to the default language, and this translated input may be accessed in step 110 of the example method of FIG. 1.

Figure 2:
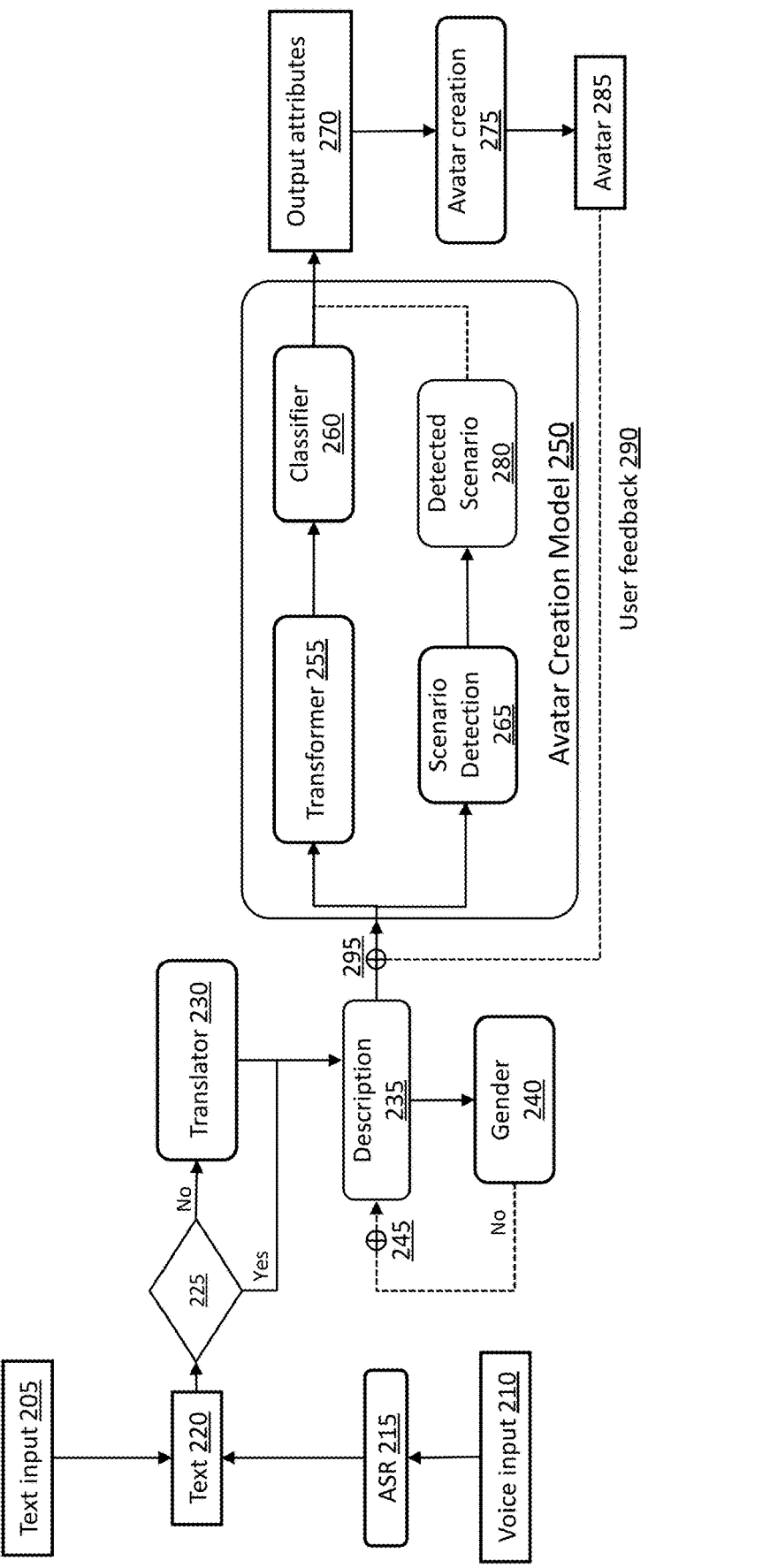
FIG. 2 illustrates an example architecture of a zero-shot NL pipeline for creating an avatar from natural-language input.

FIG. 2 illustrates an example architecture of a zero-shot NL pipeline for creating an avatar from natural-language input. As illustrated in the example of FIG. 2, natural-language input may be either, or both of, text input 205 or voice input 210. In the example architecture of FIG. 2, if a natural-language input includes voice input 210, then voice input 210 may be converted to text 220, which is a textual representation of the voice input 210. For instance, in the example architecture of FIG. 2, an automatic speech recognition (ASR) module 215 may be used to convert voice input 210 to text 220. The acquisition of text or voice input and the conversion, if any, of voice input to text input may occur on the computing device that creates the avatar or may occur on one or more other computing devices. For example, ASR 215 and the sensor(s) for detecting text or voice input may be integrated into a client device, such as a smartphone or personal computer, that generates an avatar. As another example, ASR 215 and/or the sensor(s) for detecting text or voice input may be part of a different device, separate from the one that ultimately generates an avatar.

In the example architecture of FIG. 2, text 220 may be provided to a language-detection module 225 that determines whether text 220 is in a default language, such as in English. This default language may be the language on which avatar creation model 250 is trained. If text 220 is in the default language, then text 220 becomes text description 235. If text 220 is not in the default language, then a translator such as translator 230 may translate text 220 from its language into the default language. The translated text then becomes text description 235.

As illustrated in the example architecture of FIG. 2, in particular embodiments an inference model may determine whether a gender 240 is identifiable from description 235. For example, the inference model may parse description 235 to determine whether a gender is explicitly identified in the description (e.g., the description uses gendered terms to describe the avatar's appearance) or whether a gender is implicitly identified in the description. For example, the inference model may encode description 235 and determine, based on the encodings, a predicted gender for the avatar. In particular embodiments, the inference model may determine a likelihood that description 235 refers to a particular gender. If no gender is identified in description 235, or if a gender cannot be identified with a likelihood that is above a threshold likelihood, then particular embodiments may submit a request for a user to explicitly identify the gender for the avatar. This description, which may be processed as described above, is then combined 245 with the previous description to become an updated description 235. Once finalized, description 235 is provided to an avatar creation model 250 for automatically generating the avatar. In particular embodiments, description 235 that is ready for input to avatar creation model 250 may be the natural-language input accessed in step 110 of the example method of FIG. 1.

The example architecture of FIG. 2 illustrates an embodiment in which gender is a required attribute of the avatar-creation model. For example, the availability of certain avatar attributes or the available values of certain attributes (e.g., avatar shape) may depend on the identified gender. More generally, some embodiments may have no required attributes, and some embodiments may have different required attributes. In general, if an attribute is required by a particular avatar creation model, then the avatar description obtained from the user input is checked for the presence of such required attributes, and if one or more required attributes are missing, then a request may be submitted to the user to explicitly identify the required attributes.

Step 120 of the example method of FIG. 1 includes generating, from the natural-language input and by a trained avatar-creation model, a set of avatar-attribute feature vectors. The example architecture of FIG. 2 illustrates an example in which description 235 is input to trained avatar creation model 250. Avatar creation model 250 contains two main components: (1) transformer 255 and classifier 260 and (2) scenario detection model 265. As described below, transformer 255 and classifier 260 are always used to generate an avatar, while scenario detection model 265 is conditionally used.

In the example of FIG. 2, transformer 255 is a transformer machine-learning architecture, which may be a specific architecture such as the BERT model. Transformer 255 is typically only the encoder portion of a transformer model. In the example architecture of FIG. 2, transformer 255 may encode input description 235 into a set of one or more attribute vectors, which define description 235. Classifier 260 classifies the encoded description based on the encodings provided by transformer 255.

Step 130 of the example method of FIG. 1 includes determining, by a trained avatar-attribute classifier, one or more avatar attributes from the set of avatar-attribute feature vectors. In the example architecture of FIG. 2, encodings from transformer 255 are provided to a classifier 260, which classifies the input encodings into one or more avatar attributes. The classification labels (i.e., avatar attributes) available for selection by the classifier are predetermined attribute labels. For example, attribute labels may include a gender (e.g., male or female), an age or age range (e.g., 10-20, 20-30, 30-40 years, etc.), a body shape (e.g., pear, triangle, hourglass, rectangle, inverted triangle, etc.), a skin color, a hair style, a hair color, facial features (e.g., eye shape and color, etc.), the presence or type of facial hair, the presence or type of makeup (e.g., lipstick color), a type and color of various pieces of clothing, a type and color of various footwear, and the presence and/or color of one or more accessories (e.g., backpack, glasses, hat, etc.). Based on its training, classifier 260 outputs specific textual labels derived from the vector encodings of description 235 provided by transformer 255. In particular embodiment, classifier 260 may be a set of deep-learning layers (e.g., a set of multilayer perceptron (MLP) layers) appended to transformer 255. One or more of the classification labels output by classifier 260 are included in output attributes 270. In particular embodiments, a label output by classifier 260 may be included as an output attribute 270 if the classification meets a certain reliability criterion, such as by being one of the k highest ranked classifications for the description or by having a corresponding prediction certainty or probability that is above a threshold value (e.g., 50%).

Step 140 of the example method of FIG. 1 includes generating the avatar based on the determined one or more avatar attributes for presentation on a display of a computing device. In the example of FIG. 2, output attributes 270 are input to avatar creation model 275, which draws from a predetermined database of attributes to generate an avatar with visual features that correspond to the particular output attributes. Here, avatar creation model 275 generates an avatar 285 based on the output attributes 270 identified from avatar creation model 250. For example, a computing device such as a smartphone or a tablet may have an installed 3D widget library, such as SAMSUNG AR Emoji, to construct the avatar based on the attributes predicted from the natural-language input.

After creation, avatar 285 is presented to a user, either on a display of the computing device that generated the avatar (e.g., that performed some or all of the steps of the example method of FIG. 1) or on a display of another computing device, which receives the avatar data resulting from avatar creation model 275. In particular embodiments, avatar 285 may be a fully-formed avatar for display to a user. In particular embodiments, avatar 285 may include a set of the k highest-ranking attributes output by classifier 260, allowing the user to select the particular attributes that the user desires. In particular embodiments, the k highest-ranking attributes may be accompanied by one or more avatars visually illustrating some or all of those attributes. In particular embodiments, if the k highest attributes are presented to a user, then such presentation may occur prior to avatar creation model 275 creating avatar 285.

In particular embodiments, after presenting avatar 285 to a user, the computing device may receive user feedback 290 further describing the avatar. For example, the feedback may be text or voice input, which may be processed as described above. The feedback may identify specific features to add, remove, or change (e.g., make the shoes red, or remove the glasses and add a hat, etc.), or the feedback may be a generalized description of aspects of the avatar (e.g., make the avatar fancier or happier, etc.). The user feedback 290 is used to generate another description of the avatar, which is combined 295 with description 235, and the combined text description is input to avatar creation model 250 to generate a new avatar 285 in accordance with the user's original description (i.e., original description 235) and the subsequent description generated from user feedback 290. After presentation of a revised avatar, a user may provide additional feedback, which is again processed and combined with the previous descriptions to generate another avatar, and this process may iterate until the user has no more feedback, indicating that the user is satisfied with the appearance of avatar 285.

In particular embodiments, a scenario detection model 265 may be used to determine whether one or more detected scenarios 280 are present in description 235 (and in any subsequent descriptions generated from user feedback). As explained below, such detected scenarios may mitigate the ambiguity in user descriptions of visual avatar features, particularly when the descriptions are relatively short. For example, a user description of "make an avatar named Joyce who is going to a summer party" may not correspond to any particular attributes from the predetermined attribute library, and classifier 260 is not trained on every feasible description representation of visual attributes. As a result, classifier 260 may predict output attributes 270 that do not correspond to the desired visual characteristics of the avatar.

In particular embodiment, scenario detection model 265 is based on a Named Entity Recognition (NER) model, and detects various scenarios and corresponding attributes. For instance, in the example above, scenarios may include "Joyce" (implying a female gender) and "party." For each detected scenario 280, a corresponding list of attributes replaces or supplements the attributes predicted by a classifier 260. For instance, an NER model may be trained on a dataset that includes annotated training data to identify a scenario. Scenarios may include people, places, events, activities, etc. Each scenario is associated with a set of corresponding attributes. As a result, when scenario detection model 265 detects the presence of a scenario from the input description(s), then corresponding scenario attributes are output by the avatar creation model 250. Some or all of these attributes will then become part of output attributes 270.

When classifier 260 outputs predicted attributes and scenario detection model 265 provides attributes corresponding to one or more detected scenarios 280, then the attributes associated with the detected scenarios may be given relatively higher weight than the attributes from predicted by classifier 260. As a result, if classifier 260 predicts an attribute that conflicts with an attribute corresponding to scenario detection model 265 (e.g., classifier 260 outputs "sandals" and a scenario is detected that corresponds to "leather shoes"), then the attribute determined from the scenario detection model 265 may be the one selected for inclusion in output attributes 270. If classifier 260 and the scenario-detection pathway provide attributes in different categories, then both sets of attributes may be used (provided, in particular embodiments, the attributes predicted by classifier 260 are associated with a high enough likelihood) in output attributes 270.

In particular embodiments, avatar creation model 250 is a zero-shot model in that the model is able to recognize and perform a task on new input without having been explicitly trained on that input. Transformer 255 may be a pretrained large-language model, for example trained on a large dataset of natural language input. However, since avatar creation from user input is a domain-specific task, an appropriate training dataset of suitable size is difficult to generate because the dataset needs to include all the predetermined attributes used by an avatar creation model (e.g. model 275), but classifier 260 should only output those specific attribute labels. Particular embodiments therefore use text-generation language models to automatically generate text descriptions based on a set of selected attributes. These automatically generated text descriptions constitute the training dataset for finetuning either or both of transformer 255 and classifier 260.

Text descriptions for training may be generated by first selecting a set of predefined attributes from the avatar creation dataset. Each attribute will be taken as a keyword. Then, the training-set generation process auto-completes sentences, by a text-generation language model, using one or more of the keywords. The generated sentences and corresponding keywords will be the input for supervised training, with the training output being the attribute predicted by the classifier. The training-set generation steps are repeated as desired to generate a large-scale training dataset. In particular embodiments, multiple keywords may be used to auto-complete a single sentence in the training dataset. In particular embodiments, classifier 260 may be trained (or finetuned) using the generated training dataset. In particular embodiments, one or more layers (e.g., the last few layers) of the transformer 255 may be trained using the generated training dataset.

An avatar may be used in many different use cases, for example during videoconferencing or in an VR or AR environment. As discussed above, the processes and architectures described herein may be used to efficiently and accurately generate and customize avatars for a user for use in these and other avatar applications.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including certain steps of the example method illustrated in FIG. 1, may be performed by circuitry of a computing device described herein, by a processor coupled to non-transitory computer readable storage media, or any suitable combination thereof.

Figure 3:
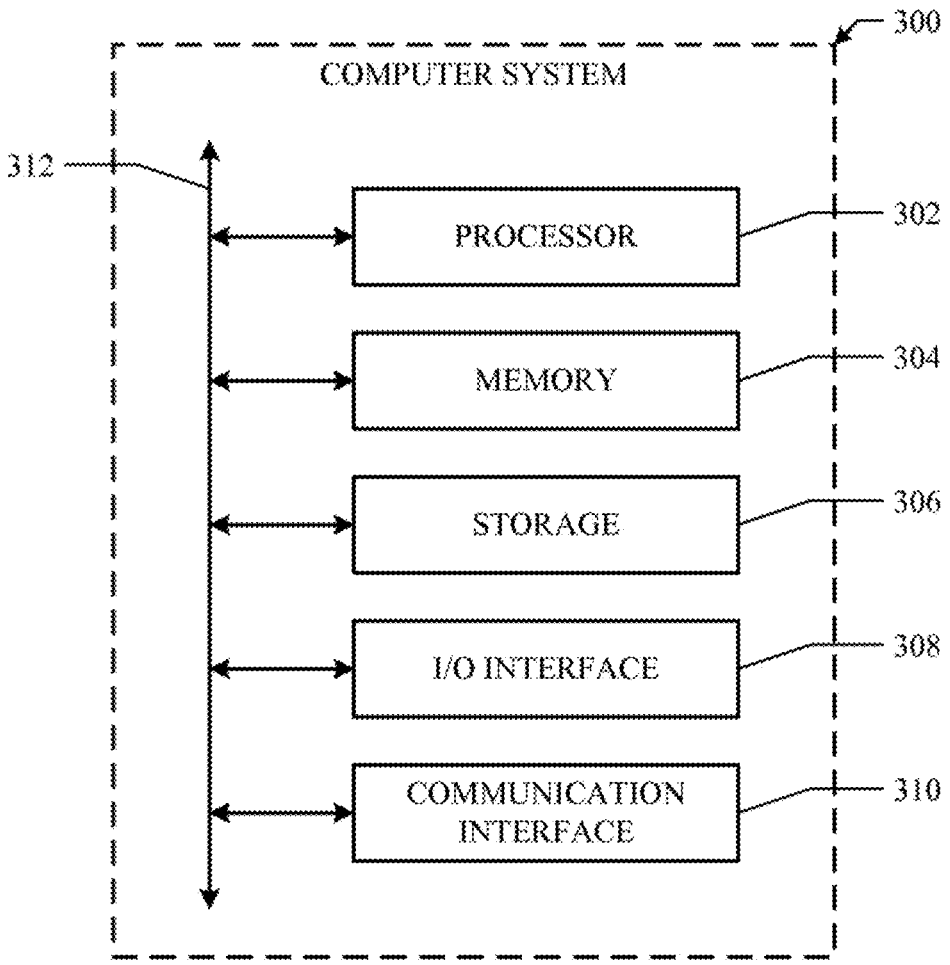
FIG. 3 illustrates an example computing system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

accessing, by a computing device, a natural-language input comprising a description of an avatar;

determining whether the accessed natural-language input identifies a required attribute for the avatar, and either:

in response to a determination that the accessed natural-language input does not identify the required attribute, then (1) submitting a request for a user to identify the required attribute for the avatar (2) receiving a user input identifying the required attribute and (3) providing the natural language input to a trained avatar-creation model; or in response to a determination that the accessed natural-language input identifies the required attribute, then providing the natural-language input to a trained avatar-creation model;

generating, from the natural-language input and by the trained avatar-creation model, a set of avatar-attribute feature vectors;

determining, by a trained avatar-attribute classifier, one or more avatar attributes from the set of avatar-attribute feature vectors; and generating the avatar based on the determined one or more avatar attributes for presentation on a display of a computing device.

2. The method of claim 1, further comprising converting the accessed natural-language input from a speech input to a text input.

3. The method of claim 1, further comprising converting the accessed natural-language input from a first language to a default language.

4. The method of claim 1, wherein the user input identifying the required attribute explicitly identifies the required attribute, and the user input explicitly identifying the required attribute is included in the natural-language input provided to the trained avatar-creation model.

5. The method of claim 1, wherein the required attribute comprises a gender of the avatar.

6. The method of claim 1, wherein the trained avatar creation model comprises an encoder of a transformer model.

7. The method of claim 1, further comprising:

determining, by a scenario detection model of the avatar-creation model, whether the natural-language input identifies one or more scenarios; and in response to a determination that the natural-language input identifies one or more scenarios, then determining one or more avatar attributes corresponding to the identified one or more scenarios and generating the avatar based at least in part on the one or more avatar attributes corresponding to the identified one or more scenarios.

8. The method of claim 7, further comprising weighting the one or more avatar attributes corresponding to the identified one or more scenarios relatively higher than the one or more avatar attributes determined from the set of avatar-attribute feature vectors.

9. The method of claim 1, further comprising:

accessing user feedback made in response to display of the avatar; and combining a description of the user feedback with the accessed natural-language input to generate one or more revised avatar attributes and a revised avatar for presentation on the display of the computing device.

10. The method of claim 1, wherein the trained avatar-attribute classifier comprises a classifier trained by:

selecting a set of predefined attributes;

generating, by a text-generation language model, a training dataset comprising one or more sentences, each sentence containing at least one attribute from the set of predefined attributes; and training the classifier based on the training dataset and the set of predefined attributes.

11. One or more non-transitory computer readable storage media storing software that is operable when executed by one or more processors to:

access a natural-language input comprising a description of an avatar;

determine whether the accessed natural-language input identifies a required attribute for the avatar, and:

in response to a determination that the accessed natural-language input does not identify the required attribute, then (1) submit a request for a user to identify the required attribute for the avatar (2) receive a user input identifying the required attribute and (3) provide the natural language input to a trained avatar-creation model; or in response to a determination that the accessed natural-language input identifies the required attribute, then provide the natural-language input to a trained avatar-creation model;

generate from the natural-language input and by a trained avatar-creation model, a set of avatar-attribute feature vectors;

determine, by a trained avatar-attribute classifier, one or more avatar attributes from the set of avatar-attribute feature vectors; and generate the avatar based on the determined one or more avatar attributes for presentation on a display of a computing device.

12. The media of claim 11, wherein the user input identifying the required attribute explicitly identifies the required attribute, and the user input explicitly identifying the required attribute is included in the natural-language input provided to the trained avatar-creation model.

13. The media of claim 11, wherein the software is further operable when executed by one or more processors to:

determine, by a scenario detection model of the avatar-creation model, whether the natural-language input identifies one or more scenarios; and in response to a determination that the natural-language input identifies one or more scenarios, then determine one or more avatar attributes corresponding to the identified one or more scenarios and generate the avatar based at least in part on the one or more avatar attributes corresponding to the identified one or more scenarios.

14. The media of claim 11, wherein the software is further operable when executed by one or more processors to:

access user feedback made in response to display of the avatar; and combine a description of the user feedback with the accessed natural-language input to generate one or more revised avatar attributes and a revised avatar for presentation on the display of the computing device.

15. The media of claim 11, wherein the trained avatar-attribute classifier comprises a classifier trained by:

selecting a set of predefined attributes;

generating, by a text-generation language model, a training dataset comprising one or more sentences, each sentence containing at least one attribute from the set of predefined attributes; and training the classifier based on the training dataset and the set of predefined attributes.

16. A system comprising one or more non-transitory computer readable storage media storing instructions; and one or more processors coupled to the non-transitory computer readable storage media, the one or more processors operable to execute the instructions to:

access a natural-language input comprising a description of an avatar;

determine whether the accessed natural-language input identifies a required attribute for the avatar, and:

in response to a determination that the accessed natural-language input does not identify the required attribute, then (1) submit a request for a user to identify the required attribute for the avatar (2) receive a user input identifying the required attribute and (3) provide the natural language input to a trained avatar-creation model; or in response to a determination that the accessed natural-language input identifies the required attribute, then provide the natural-language input to a trained avatar-creation model;

generate from the natural-language input and by a trained avatar-creation model, a set of avatar-attribute feature vectors;

determine, by a trained avatar-attribute classifier, one or more avatar attributes from the set of avatar-attribute feature vectors; and generate the avatar based at least in part on the determined one or more avatar attributes for presentation on a display of a computing device.

17. The system of claim 16, wherein the user input identifying the required attribute explicitly identifies the required attribute, and the user input explicitly identifying the required attribute is included in the natural-language input provided to the trained avatar-creation model.

18. The system of claim 16, wherein the one or more processors are further operable to execute the instructions to:

determine, by a scenario detection model of the avatar-creation model, whether the natural-language input identifies one or more scenarios; and in response to a determination that the natural-language input identifies one or more scenarios, then determine one or more avatar attributes corresponding to the identified one or more scenarios and generate the avatar based on the one or more avatar attributes corresponding to the identified one or more scenarios.

19. The system of claim 16, wherein the one or more processors are further operable to execute the instructions to:

access user feedback made in response to display of the avatar; and combine a description of the user feedback with the accessed natural-language input to generate one or more revised avatar attributes and a revised avatar for presentation on the display of the computing device.

20. The system of claim 16, wherein the trained avatar-attribute classifier comprises a classifier trained by:

selecting a set of predefined attributes;

generating, by a text-generation language model, a training dataset comprising one or more sentences, each sentence containing at least one attribute from the set of predefined attributes; and training the classifier based on the training dataset and the set of predefined attributes.

* * * * *